United States Patent
Kim et al.

(10) Patent No.: US 10,570,264 B2
(45) Date of Patent: Feb. 25, 2020

(54) PHOTOCURABLE COATING COMPOSITION, METHOD OF FORMING COATING LAYER USING THE SAME, AND APPARATUS FOR FORMING COATING LAYER USING THE SAME

(71) Applicant: Samsung Electronics Co., Ltd., Suwon-si, Gyeonggi-do (KR)

(72) Inventors: Kyung Rim Kim, Anyang-si (KR); Nam Il Koo, Hwaseong-si (KR); Sun Kwon Kim, Yongin-si (KR); Jeong Ho Moon, Incheon (KR); Sun Woo Park, Yongin-si (KR); Jong Sung Lee, Suwon-si (KR); Ji Min Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 99 days.

(21) Appl. No.: 15/783,315

(22) Filed: Oct. 13, 2017

(65) Prior Publication Data
US 2018/0105662 A1 Apr. 19, 2018

(30) Foreign Application Priority Data

Oct. 14, 2016 (KR) .................. 10-2016-0133816

(51) Int. Cl.
| | |
|---|---|
| C08J 7/04 | (2006.01) |
| C09D 7/61 | (2018.01) |
| C09D 4/06 | (2006.01) |
| C09D 133/14 | (2006.01) |
| G06F 3/044 | (2006.01) |

(52) U.S. Cl.
CPC .................. *C08J 7/04* (2013.01); *C09D 4/06* (2013.01); *C09D 7/61* (2018.01); *C09D 133/14* (2013.01); *G06F 3/044* (2013.01); *C08J 2333/14* (2013.01); *C08J 2483/06* (2013.01); *G06F 2203/04103* (2013.01)

(58) Field of Classification Search
CPC ...... C09D 175/16; C09D 175/14; C09D 4/00; C09D 133/14; C09D 7/60; C09D 7/04; C08F 2222/1086; C08F 220/18; C08L 83/044
USPC ..................................................... 522/96, 90
See application file for complete search history.

(56) References Cited

U.S. PATENT DOCUMENTS

| | | | | |
|---|---|---|---|---|
| 8,092,872 | B2 * | 1/2012 | Kondo | C09D 175/16 252/299.01 |
| 9,738,748 | B2 * | 8/2017 | Takenouchi | C08G 18/44 |
| 2016/0368241 | A1 * | 12/2016 | Iwahashi | G02B 5/3033 |
| 2017/0036242 | A1 * | 2/2017 | Lee | B05D 1/005 |

FOREIGN PATENT DOCUMENTS

| | | |
|---|---|---|
| KR | 101355499 B1 | 1/2014 |
| KR | 101621286 B1 | 5/2016 |
| WO | WO-2015/174775 A1 | 11/2015 |

* cited by examiner

*Primary Examiner* — Sanza L. McClendon
(74) *Attorney, Agent, or Firm* — Harness, Dickey & Pierce, P.L.C.

(57) ABSTRACT

A photocurable coating composition includes 50 to 150 parts by weight of a urethane acrylate oligomer having a number average molecular weight of 1300 to 1700 g/mol and 9 functional groups, 50 to 150 parts by weight of an acrylate monomer, 10 to 15 parts by weight of a photoinitiator, and 1 to 3 parts by weight of a surfactant.

17 Claims, 9 Drawing Sheets

PHOTOCURABLE COATING COMPOSITION, METHOD OF FORMING COATING LAYER USING THE SAME, AND APPARATUS FOR FORMING COATING LAYER USING THE SAME

This application claims priority from Korean Patent Application No. 10-2016-0133816 filed on Oct. 14, 2016 in the Korean Intellectual Property Office, the disclosure of which is incorporated herein by reference in its entirety.

BACKGROUND

1. Field of the Invention

The present inventive concepts relate to a photocurable coating composition, a method of forming a coating layer using the same, and/or an apparatus for forming a coating layer using the same.

2. Description of the Related Art

Coating is typically performed for the purpose of supplementing the surface characteristics of a target object by applying a coating agent to the surface of the target object to form a film, such as a thin film. Such coating has been widely used in building materials, automobile exterior parts, paper, wood, optical materials, and displays.

In particular, photocurable coating compositions for protecting surface and preventing scratch have been used in various household electric appliances, display devices, mobile phone terminals, and the like.

However, photocurable coating compositions and coating layers using the same known to date, have a limitation in satisfying high function required for miniaturized and highly-fined devices, such as display devices and touch sensors.

SUMMARY

Some example embodiments relate to a photocurable coating composition having improved functions.

Some example embodiments relate to a method of forming a coating layer having improved functions.

Some example embodiments relate to an apparatus for forming a coating layer having improved functions.

However, example embodiments are not restricted to the one set forth herein. The above and other inventive concepts will become more apparent to one of ordinary skill in the art to which the inventive concepts pertain by referencing the detailed description of the example embodiments given below.

According to an inventive concepts, a photocurable coating composition includes 50 to 150 parts by weight of a urethane acrylate oligomer having a number average molecular weight of 1300 to 1700 g/mol and 9 functional groups, 50 to 150 parts by weight of an acrylate monomer, 10 to 15 parts by weight of a photoinitiator, and 1 to 3 parts by weight of a surfactant.

According to another example embodiment, a method of forming a coating layer includes forming a coating layer on a target object, compressing the coating layer to form a compressed coating layer, and irradiating the compressed coating layer with ultraviolet rays to form a cured coating layer, wherein the coating layer includes 50 to 150 parts by weight of a urethane acrylate oligomer having a number average molecular weight of 1300 to 1700 g/mol and 9 functional groups, 50 to 150 parts by weight of an acrylate monomer, 10 to 15 parts by weight of a photoinitiator, and 1 to 3 parts by weight of a surfactant.

According to another example embodiment, an apparatus for forming a coating layer includes a coating unit for forming a coating layer on a target object, a molding unit for compressing the coating layer to form a compressed coating layer, and a photocuring unit for irradiating the compressed coating layer with ultraviolet rays to form a cured coating layer, wherein the coating layer includes 50 to 150 parts by weight of a urethane acrylate oligomer having a number average molecular weight of 1300 to 1700 g/mol and 9 functional groups, 50 to 150 parts by weight of an acrylate monomer, 10 to 15 parts by weight of a photoinitiator, and 1 to 3 parts by weight of a surfactant.

Example embodiments relate to a coated capacitive touch panel including a capacitive touch panel and a coating layer on the capacitive touch panel, the coating layer having a substantially uniform shape and including a photocurable coating composition that includes a urethane acrylate oligomer, an acrylate monomer, a photoinitiator, and a surfactant.

BRIEF DESCRIPTION OF THE DRAWINGS

The above and other example embodiments will become more apparent by describing in detail example embodiments thereof with reference to the attached drawings, in which:

FIG. 2A to 7 illustrate intermediate steps of the method of forming a coating layer according to FIG. 1.

FIGS. 12A to 15 are intermediate views illustrating a method of forming a coating layer according to some example embodiments.

DETAILED DESCRIPTION

Hereinafter, a method of forming a coating layer according to some example embodiments will be described with reference to the attached drawings.

When the terms "about" or "substantially" are used in this specification in connection with a numerical value, it is intended that the associated numerical value include a tolerance of ±10% around the stated numerical value. Moreover, when reference is made to percentages in this specification, it is intended that those percentages are based on weight, e.g., weight percentages. The expression "up to" includes amounts of zero to the expressed upper limit and all values therebetween. When ranges are specified, the range includes all values therebetween such as increments of 0.1%. Moreover, when the words "generally" and "substantially" are used in connection with geometric shapes, it is intended that precision of the geometric shape is not required but that latitude for the shape is within the scope of the disclosure.

Figure 1:
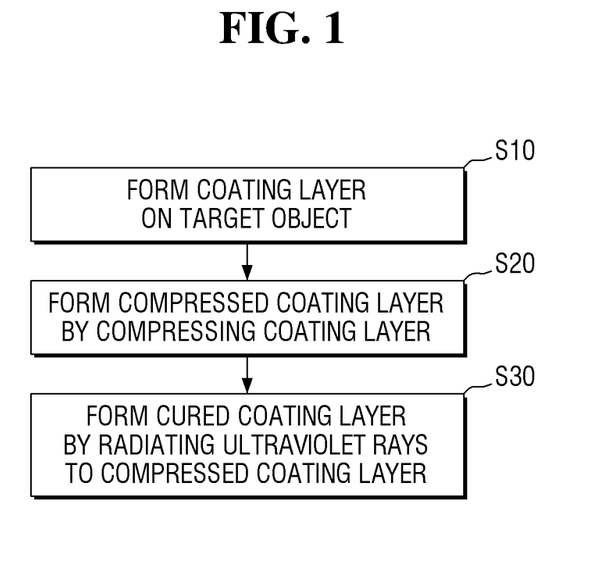
FIG. 1 is a flowchart illustrating a method of forming a coating layer according to some example embodiments.

FIG. 1 is a flowchart illustrating the steps of a method of forming a coating layer according to some example embodiments. FIG. 2A to 7 illustrate intermediate steps of the method of forming a coating layer according to FIG. 1. FIG. 2B is a cross-sectional view taken along the line A-A' of FIG. 2A.

Figure 2A:
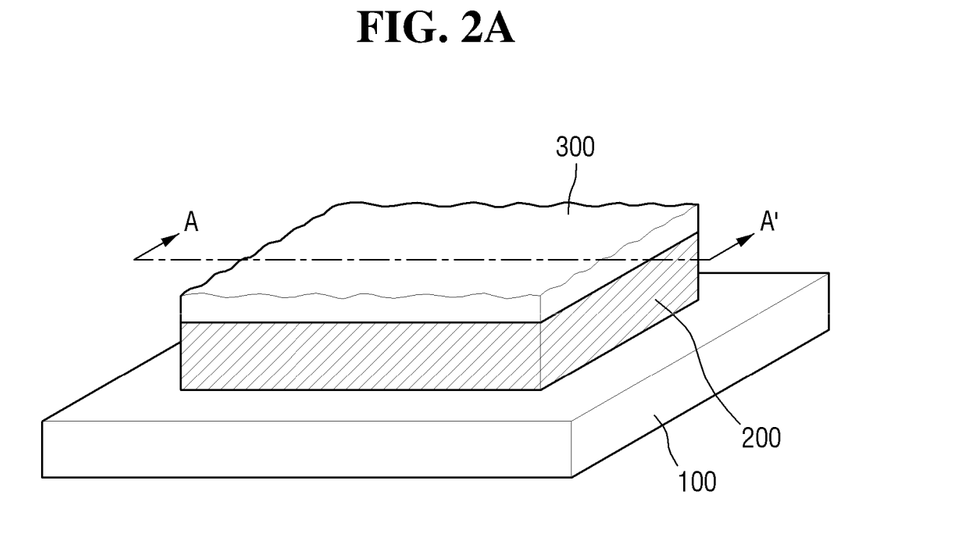
Figure 2B:
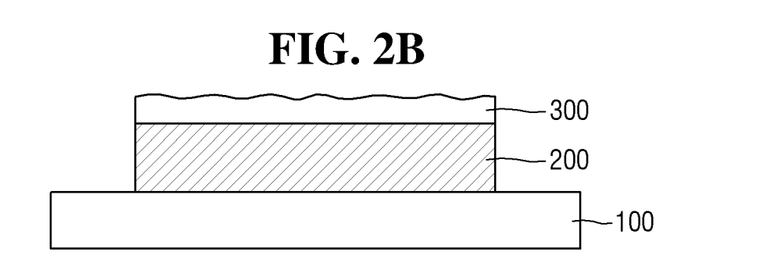
FIG. 2B is a cross-sectional view taken along the line A-A' of FIG. 2A.

Referring to FIGS. 1 to 2B, a coating layer 300 is formed on a target object 200. The target object 200 is an object which surface characteristics are to be complemented by the coating layer 300. Examples of the target object 200 may include display devices, touch sensors, and the like. However, the example embodiments are not limited thereto, and examples of the target object 200 may include various household electric appliances, mobile phone terminals, and the like.

The coating layer 300 contains a photocurable coating composition. The photocurable coating composition according to some example embodiments includes 50 to 150 parts by weight of a urethane acrylate oligomer having a number average molecular weight of 1300 to 1700 g/mol and 9 functional groups, 50 to 150 parts by weight of an acrylate monomer, 10 to 15 parts by weight of a photoinitiator, and 1 to 3 parts by weight of a surfactant.

In this case, the "part by weight" is referred to as an expression for representing the content of other substances to the reference substance by a weight ratio. For example, the photocurable coating composition including 100 parts by weight of an acrylate monomer, 13 parts by weight of a photoinitiator, and 2 parts by weight of a surfactant, with respect to 100 parts by weight of a urethane acrylate oligomer, includes about 46.5 wt % of a urethane acrylate oligomer, about 46.5 wt % of an acrylate monomer, about 6.0 wt % of a photoinitiator, and about 1.0 wt % of a surfactant, with respect to 100 wt % (% by weight) of the photocurable coating composition.

The urethane acrylate oligomer, for example, may be made of a main chain component, such as polyether, polyester, polyolefin, polyacrylate or polycarbonate, a reactive end group, and a urethane bonding group.

The urethane acrylate oligomer serves to the wear resistance of a cured coating layer formed using the photocurable coating composition.

Considering a photocuring speed and water resistance, the urethane acrylate oligomer may have 6 to 15 functional groups. For example, the urethane acrylate oligomer may include at least one of commercially available U-6LHA (6 functional groups), U-520 (10 functional groups), U-15HA (15 functional groups) (trade names, manufactured by SHIN-NAKAMURA CHEMICAL CO. LTD., Japan), and combinations thereof. However, the technical idea of the present disclosure is not limited thereto.

Specifically, the urethane acrylate oligomer may have 9 functional groups. For example, the urethane acrylate oligomer having 9 functional groups may be a commercially available UA-32P (trade name, manufactured by SHIN-NAKAMURA CHEMICAL CO. LTD., Japan). However, the technical idea of the present disclosure is not limited thereto.

In this case, a urethane acrylate oligomer having a specific number of functional groups may be a concept including other urethane acrylate oligomers serving as the urethane acrylate oligomer having a specific number of functional groups. For example, in the case of a urethane acrylate oligomer having 10 functional groups, when one functional group of the functional groups is not substantially active, this urethane acrylate oligomer having 10 functional groups may be included in a urethane acrylate oligomer having 9 functional groups.

In some embodiments, the photocurable coating composition may use a urethane acrylate oligomer having a number average molecular weight of 1300 to 1700 g/mol.

When the number average molecular weight of the urethane acrylate oligomer is less than 1300 g/mol, the wear resistance, adhesiveness and chemical resistance of the cured coating layer may deteriorate. When the number average molecular weight of the urethane acrylate oligomer is more than 1700 g/mol, the pencil hardness, wear resistance, adhesiveness and chemical resistance of the cured coating layer may deteriorate.

The photocurable coating composition includes a urethane acrylate oligomer in an amount of 50 to 150 parts by weight, and preferably 90 to 110 parts by weight. When the amount of the urethane acrylate oligomer is less than 50 parts by weight, the adhesiveness and chemical resistance of the cured coating layer may deteriorate. When the amount of the urethane acrylate oligomer is more than 150 parts by weight, the cured coating layer becomes excessively flexible, so that the pencil hardness and wear resistance of the cured coating layer deteriorate and the viscosity of the photocurable coating composition increases, thereby deteriorating workability.

An acrylate monomer serves to provide durability to the coating layer, maintain viscoelasticity and improve the workability of the photocurable coating composition by adjusting the viscosity thereof.

The acrylate monomer may be a monofunctional or polyfunctional acrylic monomer. For example, the acrylate monomer may include at least one of isobonyl acrylate (IBOA), isobonyl methacrylate (IBOMA), tetrahydrofuryl acrylate (THFA), acryloyl morpholine (ACMO), 2-phenoxyethyl acrylate, tripropyleneglycol diacrylate (TPGDA), 1,6-hexane diol diacrylate (HDDA), trimethylolpropane triacrylate (TMPTA), pentaerythritol triacrylate (PETA), dipentaerythritol hexaacrylate (DPHA), and combinations thereof. However, the example embodiments are not limited thereto, and appropriate monomer may be mixed and used in consideration of the hardness, curing time and price of the coating layer.

The photocurable coating composition may include an acrylate monomer in an amount of 50 to 150 parts by weight. When the amount of the acrylate monomer is less than 50 parts by weight, the wear resistance of the cured coating layer may deteriorate. When the amount of the acrylate monomer is more than 150 parts by weight, the hardness of the cured coating layer may increase so as to cause the surface of the cured coating layer to crack, and the viscosity of the photocurable coating composition increases so as to deteriorate the workability of the photocurable coating composition.

A photoinitiator may form a coating layer by sufficiently curing the inside and surface of the photocurable coating composition.

For example, the photoinitiator may include at least one of benzophenone-based compounds, bezoin-based compounds, benzoin ether-based compounds, benzyl ketal-based compounds, acetophenone-based compounds, anthraquinone-based compounds, thioxanthone-based compounds, and combinations thereof.

Specifically, the photoinitiator may include at least one of bis(2,4,6-trimethylbenzoyl)-phenylphosphine oxide (TPO), Darocur 1173, Irgacure-184, Irgacure-907, Irgacure-1700 (trade names, manufactured by CIBA Chemical Co., Ltd., Switzerland), Micure HP-8, Benzophenone (trade names, manufactured by Miwon Commercial Co., Ltd., Korea), and combinations thereof. However, the technical idea of the present disclosure is not limited thereto.

The photoinitiator may be used in an appropriate range in consideration of radiation characteristics of a light source, strength, and content of at least one component.

The photocurable coating composition may include a photoinitiator in an amount of 10 to 15 parts by weight. When the amount of the photoinitiator is less than 10 parts by weight, the curing of the photocurable coating composition with ultraviolet rays may not sufficiently proceed, and thus the pencil hardness of the cured coating layer may deteriorate by 1H or more. When the amount of the photoinitiator is more than 15 parts by weight, the weather resistance of the cured coating layer may deteriorate, and the photocurable coating composition may become economically disadvantageous due to the resulting price increase.

A surfactant may be used as an additive of the photocurable coating composition. For example, as the surfactant, a silicon-based surfactant may be used. For example, the silicon-based surfactant may be prepared by introducing a hydrophilic group, such as a methoxy group, a hydroxyl group or an amino group, at the end of a dimethyl siloxane oligomer or polymer molecule.

For example, as the surfactant, a modified silicon polymer may be used. Specifically, the surfactant may include a commercially available silicone-containing surface additive such as BYK-307 (trade name, manufactured by BYK Additives & Instruments, Germany). However, the example embodiments are not limited thereto.

The photocurable coating composition includes a surfactant in an amount of 1 to 3 parts by weight. When the amount of the surfactant is less than 1 part by weight, the pencil hardness of the cured coating layer may deteriorate by 1H or more. When the amount of the surfactant is more than 3 parts by weight, many bubbles are generated in the coating layer during a photocuring process, so as to deteriorate the workability of the photocurable coating composition.

The photocuring of the photocurable coating composition is used in the technical field of the inventive concepts, and is not particularly limited. For example, the photocuring thereof may be performed using ultraviolet rays.

In some example embodiments, the photocurable coating composition may include the urethane acrylate oligomer and the acrylate monomer in an amount of 200 parts by weight. Specifically, the sum of the urethane acrylate oligomer and acrylate monomer included in the photocurable coating composition may be 200 parts by weight.

For example, when the photocurable coating composition according to some example embodiments includes the urethane acrylate oligomer in an amount of 130 parts by weight, the acrylate monomer may be included in an amount of 70 parts by weight. Similarly, when the photocurable coating composition according to some example embodiments includes the urethane acrylate oligomer in an amount of 70 parts by weight, the acrylate monomer may be included in an amount of 130 parts by weight.

In some example embodiments, the photocurable coating composition may further include inorganic oxide particles. Further, the dielectric constant of the cured coating layer may be adjusted by adjusting the content of inorganic oxide particles in the photocurable coating composition.

For example, the dielectric constant of the cured coating layer may be adjusted to 5 or more by adjusting the content of inorganic oxide particles in the photocurable coating composition.

The inorganic oxide particles may include $TiO_2$, $ZrO_2$, and $SiO_2$, but the example embodiments are not limited thereto.

In some example embodiments, the photocurable coating composition may further include diamond or alumina. Further, the hardness of the cured coating layer may be adjusted by adjusting the content of diamond or alumina in the photocurable coating composition.

For example, the pencil hardness of the cured coating layer may be further increased to 9H or more by adjusting the content of diamond or alumina in the photocurable coating composition.

Referring to FIGS. 1 to 2B again, the forming of the coating layer on the target object may be performed by a coating process, such as spin coating, bar coating, spray coating, or gravure coating. However, the example embodiments are not limited thereto.

Specifically, the coating layer 300 may be formed on the target object 200 by a Meyer bar (a kind of gravure coater).

The target object 200 may be disposed on a support 100, and the support 100 may be used to perform a specific process to the target object 200.

As an example, the coating layer 300 may be formed by a bar coating process. In this case, the support 100 may be configured to fix the target object 200 on the support 100 to prevent the target object 200 from moving during a coating process.

As another example, the coating layer 300 may be formed by a spin coating process. In this case, the support 100 rotates the target object 200 coated with the photocurable coating composition, and thus the coating layer 300 is formed on the target object 200.

However, the surface or thickness of the coating layer 300 formed on the target object 200 by a coating process may not be sufficiently uniform throughout the coating layer 300.

Figure 3:
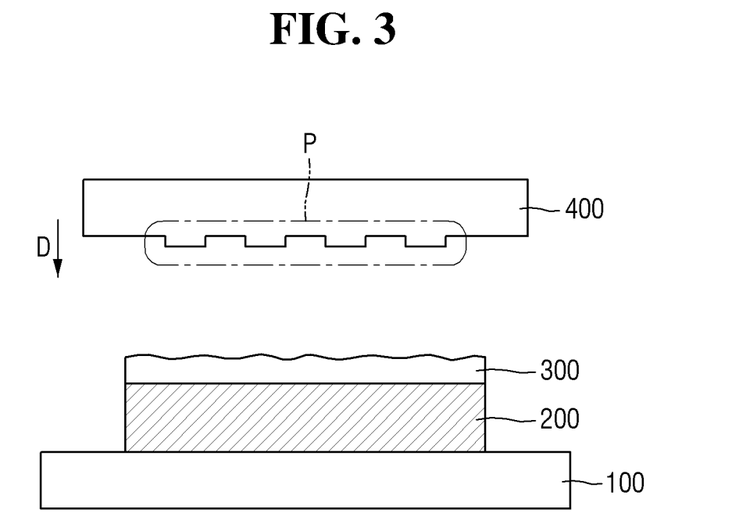
Figure 4:
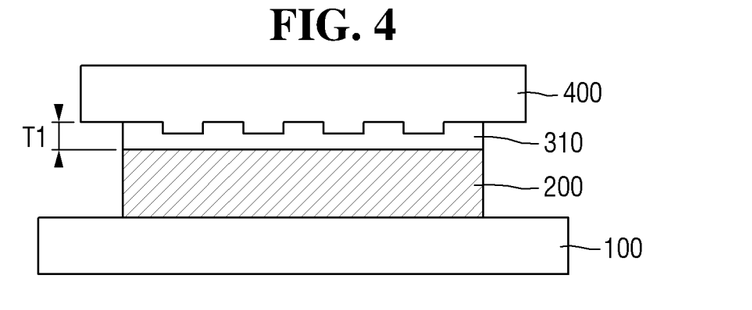

Therefore, referring to FIGS. 1, 3, and 4, the coating layer 300 is compressed to form a compressed coating layer 310 (S20).

The process of forming the compressed coating layer 310 may include a process of compressing the coating layer 300 with a mold 400. The mold 400 compresses the coating layer 300 by press molding to form the compressed coating layer 310.

Specifically, as shown in FIGS. 3 and 4, the mold 400 approaches the coating layer 300 in a direction D perpendicular to a plane extending from the coating layer 300 to compress the coating layer 300. Thus, the compressed coating layer 310 may be formed on the target object 200.

The mold 400 may include a glass mold capable of transmitting ultraviolet rays, or a polymer mold. However, the example embodiments are not limited thereto, and the mold 400 may also include a glass-like mold capable of transmitting ultraviolet rays.

For example, the mold 400 may be an indium tin oxide (ITO) film. The ITO film may be a transparent film transmitting ultraviolet rays. Since the ITO film acts as a release film to the coating layer 300, the removal of the mold 400 may be further easily performed later.

As shown in FIG. 4, when the thickness of the compressed coating layer 310 becomes a desired, or alternatively predetermined thickness T1, the mold 400 may stop the compression of the coating layer 300. That is, the mold 400 may compress the coating layer 300 until the distance between the target object 200 and the mold 400 becomes the first thickness T1.

In some example embodiments, the mold 400 may include a pattern P. Specifically, the mold 400 may include the pattern P formed on the lower surface of the mold 400.

It is shown in FIG. 3 that the pattern P is formed on only a portion of the lower surface of the mold 400, the portion thereof being in contact with the coating layer 300. However, the example embodiments are not limited thereto, and the pattern P may be formed on all or a part of the lower surface of the mold 400.

It is shown in FIG. 3 that the pattern P has a concavo-convex shape. However, the example embodiments are not limited thereto, and the pattern P may have other shapes, such as a grid shape. Further, unlike shown in the drawing, the lower surface of the mold 400, the lower surface thereof being brought into contact with the coating layer 300, may have a general smooth shape.

Accordingly, the coating layer 300 may be converted into the compressed coating layer 310 having a shape corresponding to the pattern P. Specifically, the coating layer 300 is compressed by the mold 400, and the upper surface of the compressed coating layer 310, the upper surface thereof being brought into contact with the mold 400, may have a shape corresponding to the pattern P of the mold 400. For example, when the pattern P has a concavo-convex shape, the upper surface of the compressed coating layer 310 may have a shape corresponding to the concavo-convex shape of the pattern P.

Figure 5:
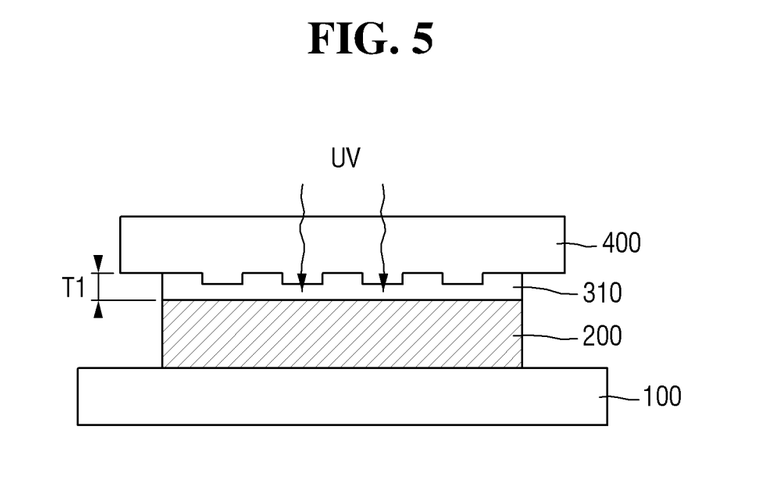
Figure 6:
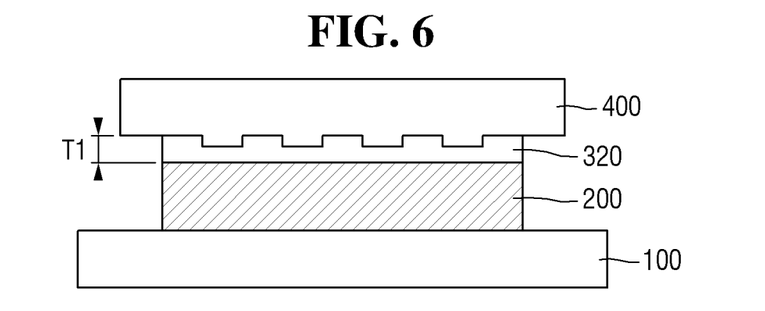

Referring to FIGS. 1, 5, and 6, the compressed coating layer 310 is irradiated with ultraviolet (UV) rays to form a cured coating layer 320 (S30).

Ultraviolet (UV) rays have a luminous distribution of 400 nm or less, for example, a wavelength of 150 to 400 nm. For example, ultraviolet (UV) rays may be radiated using a low-pressure mercury lamp, a medium-pressure mercury lamp, a high-pressure mercury lamp, an ultrahigh-pressure mercury lamp, a chemical lamp, a black light lamp, a microwave excitation mercury lamp, or a metal halide lamp.

Further, the intensity of ultraviolet (UV) rays may be appropriately adjusted depending on the physical properties of a required photocurable coating composition. Specifically, ultraviolet (UV) rays may have an intensity of 10 to 5000 mJ/cm$^2$, which is useful for activity of a photoinitiator. For example, ultraviolet (UV) rays may have an intensity of 500 mJ/cm$^2$.

Ultraviolet (UV) rays may cause a photopolymerization reaction in the compressed coating layer 310. Due to the caused photopolymerization reaction, the cured coating layer 320 is formed on the target object 200.

As shown in FIGS. 5 and 6, while the mold 400 presses the compressed coating layer 310, the compressed coating layer 310 is irradiated with ultraviolet (UV) rays, so as to form the cured coating layer 320. Thus, the cured coating layer 320, like the compressed coating layer 310, may have the first thickness T1.

Further, the upper surface of the cured coating layer 320, the upper surface thereof being brought into contact with the mold 400, may have a shape corresponding to the pattern P of the mold 400. For example, when the pattern P has a concavo-convex shape, the upper surface of the cured coating layer 320 may have a shape corresponding to the concavo-convex shape of the pattern P.

Figure 7:
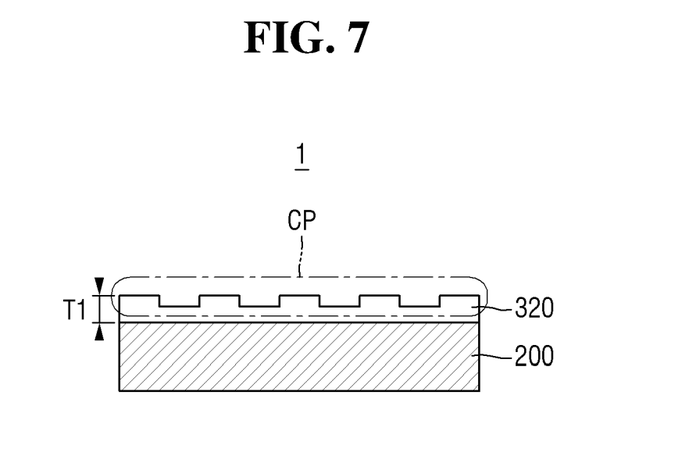

Referring to FIG. 7, the mold 400 disposed on the cured coating layer 320 may be removed. Further, the target object 200 provided thereon with the cured coating layer 320 may be separated from the support 100, so as to provide a coated target object 1.

Accordingly, the cured coating layer 320 of the coated target object 1 may have the first thickness T1.

Further, the cured coating layer 320 of the coated target object 1 may have a corresponding pattern CP corresponding to the pattern P of FIG. 3. For example, when the pattern P has a concavo-convex shape, the corresponding pattern CP may have a concavo-convex shape corresponding to the concavo-convex shape of the pattern P.

Therefore, in the method of forming a coating layer according to some example embodiments, the thickness of the cured coating layer 320 may be adjusted by adjusting the first thickness, and the texture of the cured coating layer 320 may be adjusted by adjusting the pattern P of the mold 400.

In some example embodiments, the mold 400 may be an indium tin oxide (ITO) film. In this case, the ITO film acts as a release film, and thus the removal of the mold 400 from the cured coating layer 320 may be further easily performed. Further, when the removal of the mold 400 from the cured coating layer 320 becomes easier, the defects of the corresponding pattern CP may be significantly reduced, and thus the corresponding pattern CP of the cured coating layer 320 may more precisely correspond to the pattern P of the mold 400.

For example, when the ITO film has a smooth surface without a special shape, the surface of the cured coating layer 320 may have a corresponding smooth shape. Thus, the cured coating layer 320 may have a high-gloss surface. That is, the surface processing of the cured coating layer 320 may be easily performed by using the ITO film as the mold 400.

Hereinafter, the example embodiments will be described with reference to Examples 1 to 3 and Comparative Examples 1 to 5. However, the example embodiments are not limited to these Examples, and may be modified in various forms. Those skilled in the art will appreciate that various modifications, additions and substitutions are possible, without departing from the scope and spirit of the invention. Therefore, it should be understood that the above-described example embodiments are illustrative, not restrictive, in all aspects.

Example 1

100 parts by weight of a urethane acrylate oligomer (UA-32P) having a number average molecular weight of about 1500 g/mol and 9 functional groups, 100 parts by weight of an acrylate monomer (DPHA), 12 parts by weight of a first photoinitiator (Irgacure-184), 1 part by weight of a second photoinitiator (TPO), and 1.7 parts by weight of a surfactant (BYK-307) were mixed to prepare a photocurable coating composition. The compositions of components used are given in Table 1 below.

The prepared photocurable coating composition was stirred for 1 hour, and was then applied onto a target object to a thickness of 50 μm by a Meyer bar. Subsequently, the applied photocurable coating composition was dried for 1 minute at 70° C., and was then irradiated with ultraviolet rays having an intensity of 500 mJ/cm$^2$, so as to form a cured coating layer.

Example 2

130 parts by weight of a urethane acrylate oligomer (UA-32P) having a number average molecular weight of about 1500 g/mol and 9 functional groups, 70 parts by weight of an acrylate monomer (DPHA), 12 parts by weight of a first photoinitiator (Irgacure-184), 1 part by weight of a second photoinitiator (TPO), and 1.7 parts by weight of a surfactant (BYK-307) were mixed to prepare a photocurable coating composition. The compositions of components used are given in Table 1 below.

Subsequently, a cured coating layer was formed in the same manner as in Example 1.

Example 3

70 parts by weight of a urethane acrylate oligomer (UA-32P) having a number average molecular weight of about 1500 g/mol and 9 functional groups, 130 parts by weight of an acrylate monomer (DPHA), 12 parts by weight of a first photoinitiator such as 1-hydroxycyclohexyl-1-phenyl methanone (Irgacure-184), 1 part by weight of a second photoinitiator such as bis(2,4,6-trimethylbenzoyl)-phenyl-phosphine oxide (TPO), and 1.7 parts by weight of a surfactant (BYK-307) were mixed to prepare a photocurable coating composition. The compositions of components used are given in Table 1 below.

Subsequently, a cured coating layer was formed in the same manner as in Example 1.

Comparative Example 1

70 parts by weight of a urethane acrylate oligomer (UA-32P) having a number average molecular weight of about 1500 g/mol and 9 functional groups, 30 parts by weight of an acrylate monomer such as dipentaerythritol hexaacrylate (DPHA), 12 parts by weight of a first photoinitiator (Irgacure-184), 1 part by weight of a second photoinitiator (TPO), and 1.7 parts by weight of a surfactant (BYK-307) were mixed to prepare a photocurable coating composition. The compositions of components used are given in Table 1 below.

Subsequently, a cured coating layer was formed in the same manner as in Example 1.

Comparative Example 2

30 parts by weight of a urethane acrylate oligomer (UA-32P) having a number average molecular weight of about 1500 g/mol and 9 functional groups, 170 parts by weight of an acrylate monomer (DPHA), 12 parts by weight of a first photoinitiator (Irgacure-184), 1 part by weight of a second photoinitiator (TPO), and 1.7 parts by weight of a surfactant (BYK-307) were mixed to prepare a photocurable coating composition. The compositions of components used are given in Table 1 below.

Subsequently, a cured coating layer was formed in the same manner as in Example 1.

Comparative Example 3

100 parts by weight of a urethane acrylate oligomer (UA-32P) having a number average molecular weight of about 1900 g/mol and 9 functional groups, 100 parts by weight of an acrylate monomer (DPHA), 12 parts by weight of a first photoinitiator (Irgacure-184), 1 part by weight of a second photoinitiator (TPO), and 1.7 parts by weight of a surfactant (BYK-307) were mixed to prepare a photocurable coating composition. The compositions of components used are given in Table 1 below.

Subsequently, a cured coating layer was formed in the same manner as in Example 1.

Comparative Example 4

100 parts by weight of a urethane acrylate oligomer (UA-32P) having a number average molecular weight of about 1100 g/mol and 9 functional groups, 100 parts by weight of an acrylate monomer (DPHA), 12 parts by weight of a first photoinitiator (Irgacure-184), 1 part by weight of a second photoinitiator (TPO), and 1.7 parts by weight of a surfactant (BYK-307) were mixed to prepare a photocurable coating composition. The compositions of components used are given in Table 1 below.

Subsequently, a cured coating layer was formed in the same manner as in Example 1.

Comparative Example 5

100 parts by weight of a urethane acrylate oligomer (UA-32P) having a number average molecular weight of about 1500 g/mol and 10 functional groups, 100 parts by weight of an acrylate monomer (DPHA), 12 parts by weight of a first photoinitiator (Irgacure-184), 1 part by weight of a second photoinitiator (TPO), and 1.7 parts by weight of a surfactant (BYK-307) were mixed to prepare a photocurable coating composition. The compositions of components used are given in Table 1 below.

Subsequently, a cured coating layer was formed in the same manner as in Example 1

The average molecular weight of each of, or at least one of, the urethane acrylate oligomers used in Examples and Comparative Examples may be measured by gel permeation chromatography (GPC). For example, the average molecular weight of each of, or at least one of, the urethane acrylate oligomers may be measured by Agilent 1200 of Agilent Technologies Co., Ltd.

Further, the thickness of the formed cured coating layer may be measured by a microgauge.

TABLE 1

| (Unit: part by weight) | | | | | | | | |
|---|---|---|---|---|---|---|---|---|
| | Ex. 1 | Ex. 2 | Ex. 3 | Comp. Ex. 1 | Comp. Ex. 2 | Comp. Ex. 3 | Comp. Ex. 4 | Comp. Ex. 5 |
| 9 functional 1500 g/mol oligomer | 100 | 130 | 70 | 170 | 30 | — | — | — |
| 9 functional 1900 g/mol oligomer | — | — | — | — | — | 100 | — | — |
| 9 functional 1100 g/mol oligomer | — | — | — | — | — | — | 100 | — |

TABLE 1-continued (Unit: part by weight)

|  | Ex. 1 | Ex. 2 | Ex. 3 | Comp. Ex. 1 | Comp. Ex. 2 | Comp. Ex. 3 | Comp. Ex. 4 | Comp. Ex. 5 |
|---|---|---|---|---|---|---|---|---|
| 10 functional 1500 g/mol oligomer | — | — | — | — | — | — | — | 100 |
| DPHA | 100 | 70 | 130 | 30 | 170 | 100 | 100 | 100 |
| First photoinitiator | 12 | 12 | 12 | 12 | 12 | 12 | 12 | 12 |
| Second photoinitiator | 1 | 1 | 1 | 1 | 1 | 1 | 1 | 1 |
| Surfactant | 1.7 | 1.7 | 1.7 | 1.7 | 1.7 | 1.7 | 1.7 | 1.7 |

The physical properties of the cured coating layers formed in Examples and Comparative Examples were measured by the following method, and the results thereof are given in Table 2 below according to 4-step evaluation criteria (⊚ excellent, ○: good, Δ normal, ×: poor).

1) Transmittance

Total transmittance and total haze are measured with a light source (D65) using a spectrophotometer (HZ-1, Suga Test Instruments Co., Ltd., Japan).

2) Pencil Hardness

Only the wood of a Mitsubishi evaluation pencil (UNI) is cut to expose a cylindrical core to 3 mm, and the core is placed on an abrasive paper disposed on a flat surface at a right angle and a circle is drawn on the abrasive paper, so as to abrade the core such that the tip of the core is flat and sharp. Then, the core is brought into contact with a cured coating layer at an angle of about 45°, and 1 kg of a load is applied, so as to move the core to 10 mm at a uniform speed. This process is carried out five times while changing the position of the cured coating layer, so as to measure the hardness of the cured coating layer.

3) Wear Resistance

A device that reciprocates while applying a load of 1 kg with steel wool (#0000) (anti-scratch meter, Shinto Scientific, Heidon) reciprocates on the cured coating layer 3000 times, and then scratch is observed.

4) Adhesiveness

A total of 11 lines are drawn on the cured coating layer at 1 mm intervals to make 100 squares, and then peeling tests are carried out five times with a Japanese Nichiban tape. The average value obtained after the peeling test is evaluated according to the following criteria.

Excellent: 0/100 (the number of peeled squares/the total number of squares)

Good: 1~10/100 (the number of peeled squares/the total number of squares)

Normal: 11~20/100 (the number of peeled squares/the total number of squares)

Poor: 21 or more/100 (the number of peeled squares/the total number of squares)

5) Chemical Resistance

A load of 500 g is applied onto the cured coating layer with a pencil eraser under a methyl alcohol condition. The pencil eraser reciprocates 250 times at 40 times per minute while introducing methyl alcohol. In this case, degree of the cured coating layer being stripped is observed to measure chemical resistance.

TABLE 2

|  | Ex. 1 | Ex. 2 | Ex. 3 | Comp. Ex. 1 | Comp. Ex. 2 | Comp. Ex. 3 | Comp. Ex. 4 | Comp. Ex. 5 |
|---|---|---|---|---|---|---|---|---|
| Transmittance | >90% | >90% | >90% | >90% | >90% | >90% | >90% | >90% |
| Pencil hardness | ⊚ (9H) | ○ (7H) | ⊚ | ○ | ⊚ | ○ | ⊚ | ○ |
| Wear resistance | ⊚ | ○ | ○ | Δ | ○ | Δ | Δ | ○ |
| adhesiveness | ⊚ | ⊚ | ○ | ⊚ | Δ | ⊚ | Δ | ○ |
| Chemical resistance | ⊚ | ⊚ | ○ | ⊚ | Δ | ⊚ | Δ | ○ |

As illustrated in Table 2 above, it can be ascertained that the cured coating layers of Examples 1 to 3 have good transmittance, pencil hardness, wear resistance, adhesiveness, and chemical resistance. Particularly, it can be ascertained that the cured coating layer of Example 1 exhibits excellent transmittance, pencil hardness, wear resistance, adhesiveness, and chemical resistance.

In contrast, it can be ascertained that the wear resistance of the cured coating layer of Comparative Example 1 is poorer than the wear resistance of the cured coating layer of Example 2, and it can be ascertained that the adhesiveness and wear resistance of the cured coating layer of Comparative Example 2 is poorer than the adhesiveness and wear resistance of the cured coating layer of Example 3.

It can be ascertained that the cured coating layer of Comparative Example 3 contains a urethane acrylate oligomer having a number average molecular weight of about 1900 g/mol, and the pencil hardness and wear resistance of the cured coating layer of Comparative Example 3 is poorer than the pencil hardness and wear resistance of the cured coating layer of Example 1.

It can be ascertained that the cured coating layer of Comparative Example 4 contains a urethane acrylate oligomer having a number average molecular weight of about 1100 g/mol, and the wear resistance, adhesiveness and chemical resistance of the cured coating layer of Comparative Example 4 is poorer than the wear resistance, adhesiveness and chemical resistance of the cured coating layer of Example 1.

It can be ascertained that the cured coating layer of Comparative Example 5 contains a urethane acrylate oligomer having 10 functional groups, and the physical properties of the cured coating layer of Comparative Example 5 are poorer than the physical properties of the cured coating layers of Comparative Examples 1 to 4.

However, it can be ascertained that the cured coating layer of Example 1 containing a urethane acrylate oligomer having 9 functional groups has excellent physical properties compared to the cured coating layer of Comparative Example 5.

Therefore, the method of forming a coating layer according to some example embodiments can provide a cured coating layer 320 having improved functions.

Hereinafter, a coated target object formed by using the method of forming a coating layer according to some example embodiments will be described with reference to FIGS. 1 to 8. For the convenience of explanation, the contents overlapping with the example embodiments having been described with reference to FIGS. 1 to 7 will be briefly described or will be omitted.

Figure 8:
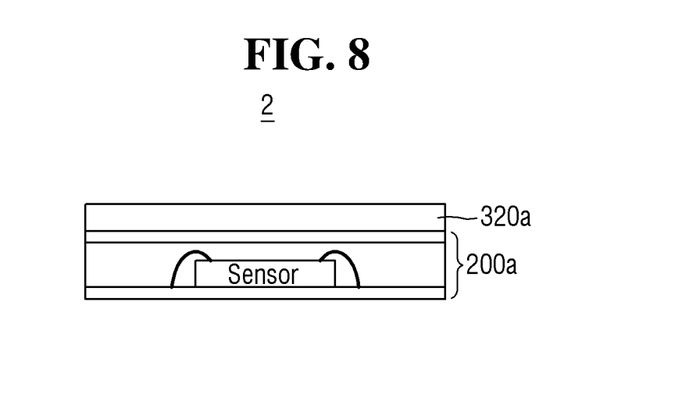
FIG. 8 is a cross-sectional view of a coated target object formed by using the method of forming a coating layer according to some example embodiments.

FIG. 8 is a cross-sectional view of a coated target object formed by using the method of forming a coating layer according to some example embodiments.

Referring to FIG. 8, a coated target object 2 includes a target object 200a and a cured coating layer 320a.

The target object 200a and cured coating layer 320a may correspond to the target object 200 and cured coating layer 320 of FIG. 7, respectively.

In this case, the target object 200a may include a capacitive touch panel.

The capacitive touch panel may be operated by a principle in which a sensor recognizes a portion where the amount of current in a touch panel using the capacitance in the human body when a user touches the touch panel, and the size of the portion is calculated to detect a position.

The coating layer of the capacitive touch panel may require high hardness in order to protect the capacitive touch panel. Further, the coating layer of the capacitive touch panel may require high permittivity for touch sensitivity of the capacitive touch panel, and may require high transmittance and high gloss for aesthetic sense.

Therefore, the method of forming a coating layer according to some example embodiments can provide a cured coating layer 320a having improved functions for the capacitive touch panel.

Hereinafter, a method of forming a coating layer according to some example embodiments will be described with reference to FIGS. 1 to 10. For the convenience of explanation, the contents overlapping with the example embodiments having been described with reference to FIGS. 1 to 8 will be briefly described or will be omitted.

Figure 9:
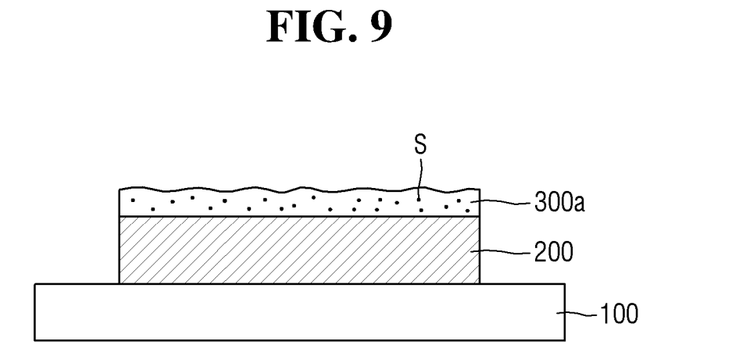
FIGS. 9 and 10 are cross-sectional views illustrating a process of drying a coating layer in the method of forming a coating layer according to some example embodiments.
Figure 10:
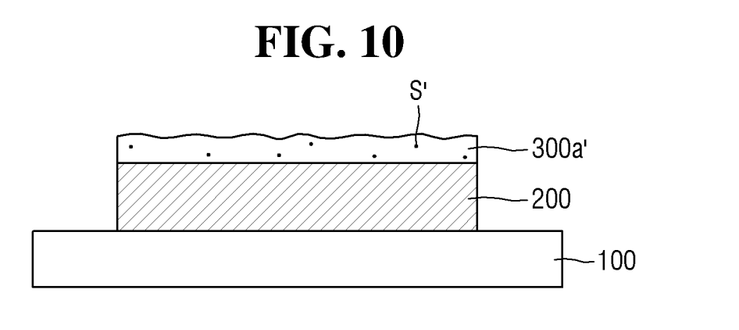

FIGS. 9 and 10 are cross-sectional views illustrating a process of drying a coating layer in the method of forming a coating layer according to some example embodiments.

Referring to FIG. 9, a coating layer 300a corresponding to the coating layer 300 of FIGS. 2A and 2B may further include a solvent S. That is, the photocurable coating composition may be diluted with the solvent S, and thus the coating layer 300a containing the solvent S may be formed on the target object 200.

The solvent S can improve the workability of a coating process by diluting the photocurable coating composition. Specifically, the solvent S may include at least one of methyl ethyl ketone (MEK), methyl isobutyl ketone (MIBK), propylene glycol monomethyl ether acetate (PGMEA), and combinations thereof. However, the example embodiments are not limited thereto.

In the method of forming a coating layer according to some example embodiments, similarly to the coating layer 300 of FIGS. 2A and 2B, the coating layer 300a is formed, and then the coating layer 300a is dried to remove all or a part of the solvent S.

The drying of the coating layer 300a may be performed by applying heat H1 to the lower surface of the target object 200 through the support 100. In this case, the degree of removing the solvent S may be adjusted by adjusting the time of applying heat H1 or the intensity of heat H1. However, the example embodiments are not limited thereto, and the drying of the coating layer 300a may also be performed by lowering the atmospheric pressure around the coating layer 300a. In this case, the degree of removing the solvent S may be adjusted by adjusting the time of lowering atmospheric pressure or the degree of lowering atmospheric pressure.

Referring to FIG. 10, the dried coating layer 300a' does not contain the solvent S, or contains a small amount of the solvent S.

Subsequently, the dried coating layer 300a', similarly to the coating layer 300 of FIG. 3, may be formed into the cured coating layer 320 according to the method of forming a coating layer having been described with reference to FIGS. 3 to 7.

Referring to FIGS. 3 to 7 and 10, when the dried coating layer 300a' contains a large amount of the solvent S, the viscosity of the dried coating layer 300a' is low, and thus it may be easier to form the compressed coating layer 310 by compressing the dried coating layer 300a'. That is, the first thickness T1 of the cured coating layer 300a' may be more precisely adjusted.

In contrast, when the dried coating layer 300a' contains a small amount of the solvent S, the viscosity of the dried coating layer 300a' is high, and thus the defects of the cured coating layer 320 formed by irradiation with ultraviolet (UV) rays may be reduced. That is, the corresponding pattern CP of the cured coating layer 320 may more precisely correspond to the pattern P of the mold 400.

Therefore, in the method of forming a coating layer according to some example embodiments, the cured coating layer 320 having improved functions can be provided, and the physical properties of the cured coating layer 320 can be adjusted by adjusting the degree of drying the coating layer 300a.

Hereinafter, a method of forming a coating layer according to some example embodiments will be described with reference to FIGS. 1 to 11. For the convenience of explanation, the contents overlapping with the example embodiments having been described with reference to FIGS. 1 to 8 will be briefly described or will be omitted.

Figure 11:
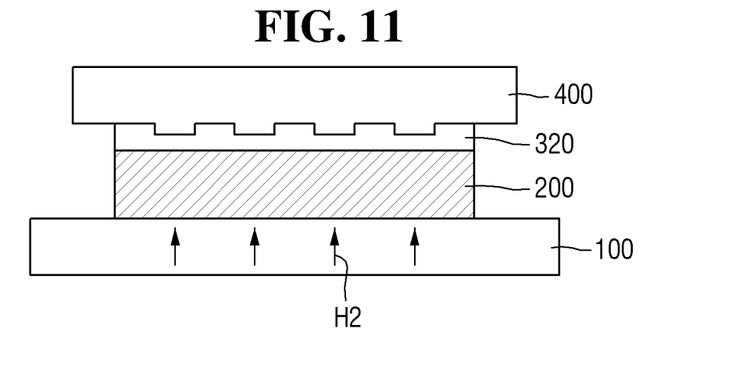
FIG. 11 is a cross-sectional view illustrating a process of annealing a cured coating layer in the method of forming a coating layer according to some example embodiments.

FIG. 11 is a cross-sectional view illustrating a process of annealing a cured coating layer in the method of forming a coating layer according to some example embodiments.

Referring to FIG. 11, in the method of forming a coating layer according to some example embodiments, the cured coating layer 320 is formed as shown in FIG. 6, and then the cured coating layer 320 is annealed.

The annealing of the cured coating layer 320 may be performed by applying heat H2 to the lower surface of the target object 200 through the support 100. However, the example embodiments are not limited thereto, and the annealing of the cured coating layer 320 may also be performed by other heat treatment processes of applying heat to the cured coating layer 320.

Annealing is referred to as a process of restoring the physical damage (distortion) of an object to be annealed through heat treatment. Therefore, the cured coating layer 320 having been subjected to annealing may have improved hardness and wear resistance.

Therefore, the method of forming a coating layer according to some example embodiments can provide a cured coating layer 320 having further improved functions.

Hereinafter, a method of forming a coating layer according to some example embodiments will be described with reference to FIGS. 1 to 15. For the convenience of explanation, the contents overlapping with the example embodiments having been described with reference to FIGS. 1 to 11 will be briefly described or will be omitted.

FIGS. 12A to 15 are intermediate views illustrating a method of forming a coating layer according to some example embodiments. FIG. 12B is a cross-sectional view taken along the line B-B' of FIG. 12A.

Figure 12A:
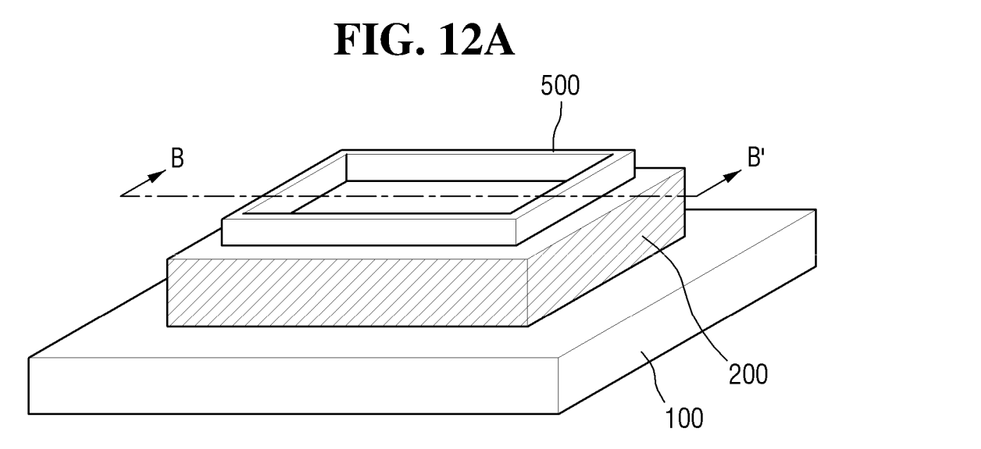
Figure 12B:
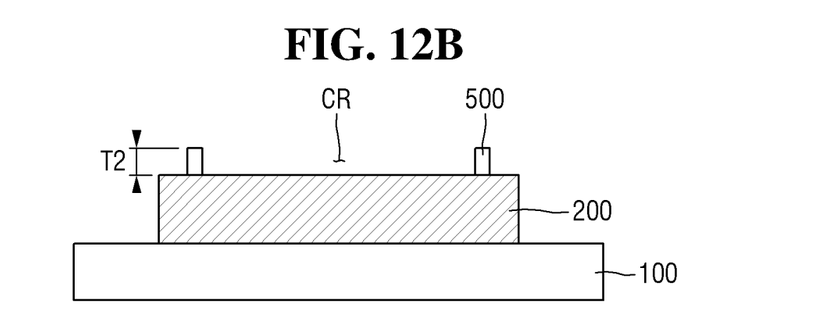
FIG. 12B is a cross-sectional view taken along the line B-B' of FIG. 12A.

Referring to FIGS. 12A and 12B, the method of forming a coating layer according to some example embodiments includes a process of forming a spacer 500 defining a coating region CR on the target object 200 before forming the coating layer 300 of FIGS. 2A and 2B.

The spacer 500 formed on the target object 200 may be made of polyethylene terephthalate (PET). In this case, the spacer 500 may have a second thickness T2.

Specifically, the spacer 500 is provided in the form of a PET film having a second thickness T2 to define a coating region CR on the target object 200. However, the example embodiments are not limited thereto, and the spacer 500 may contain a material, such as alumina or Teflon.

In some example embodiments, the spacer 500 is provided in the form of a PET film having a thickness of 50 μm or less to define a coating region CR on the target object 200. That is, the second thickness T2 of the spacer 500 may be 50 μm or less.

Figure 13:
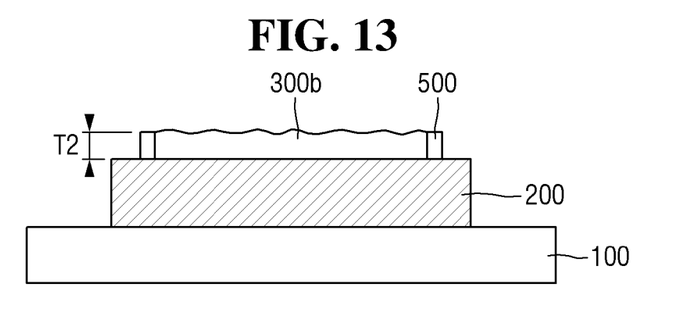

Referring to FIG. 13, a coating layer 300b is formed in the coating region CR.

Specifically, the coating layer 300b may be formed in the coating region CR on the target object 200 by a coating process, such as spin coating, bar coating or spray coating. However, the example embodiments are not limited thereto.

In this case, the coating layer 300b may have second thickness T2. However, the surface or thickness of the coating layer 300b formed on the target object 200 by a coating process, similarly to the surface or thickness of the coating layer 300 of FIGS. 2A to 3, may not be sufficiently uniform throughout the coating layer 300b.

Therefore, referring to FIGS. 14 and 15, the coating layer 300b, similarly to the coating layer 300 of FIG. 3, may be formed into a cured coating layer 320b according to the method of forming a coating layer having been described with reference to FIGS. 3 to 7.

In this case, in the process of forming the cured coating layer 320b, the coating layer 300b is compressed by the mold 400, and the compression of the coating layer 300b by the mold 400 may be stopped when the mold 400 is brought into contact with the spacer 500. That is, the mold 400 may compress the coating layer 300b until the distance between the target object 200 and the mold 400 becomes the second thickness T2.

Therefore, the cured coating layer 320b may have the second thickness T2 which is the same as the thickness of the spacer 500.

Further, the upper surface of the cured coating layer 320b, similarly to the upper surface of the cured coating layer of FIG. 6, may have a shape corresponding to the pattern P' of the mold 400.

Figure 15:
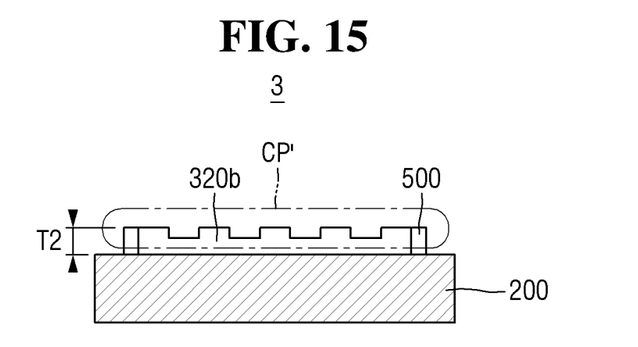

Referring to FIG. 15, the mold 400 disposed on the cured coating layer 320b may be removed. Further, the target object 200 provided thereon with the cured coating layer 320b may be separated from the support 100, so as to provide a coated target object 3.

Accordingly, the cured coating layer 320b of the coated target object 3 may have the second thickness T2.

Figure 14:
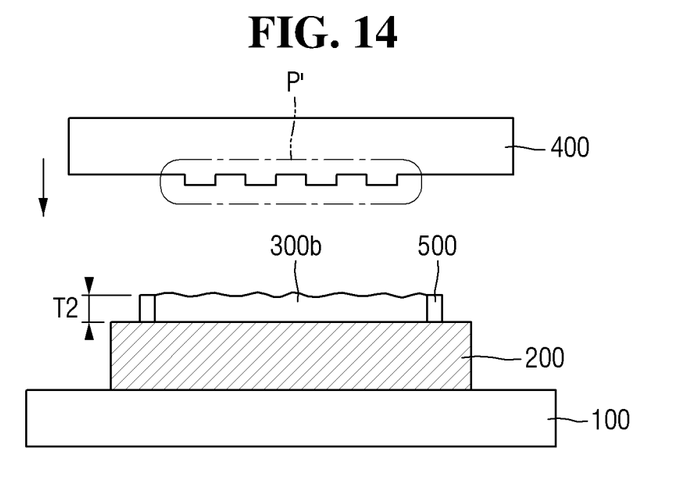

Further, the cured coating layer 320b of the coated target object 3, similarly to the cured coating layer 320 of FIG. 7, may include a corresponding pattern CP' corresponding to the pattern P' of FIG. 14.

Therefore, in the method of forming a coating layer according to some example embodiments, the thickness of the cured coating layer 320b may be adjusted by adjusting the second thickness T2, and the texture of the cured coating layer 320b may be adjusted by adjusting the pattern P' of the mold 400. Further, in the method of forming a coating layer according to some example embodiments, the cured coating layer 320 having improved functions can be provided by using the coating layer 300b including the photocurable coating composition. Further, in the method of forming a coating layer according to some example embodiments, the thin cured coating layer 320b can be provided by using the spacer 500 having a thickness of 50 μm or less.

Hereinafter, an apparatus for forming a coating layer according to some example embodiments will be described with reference to FIGS. 1 to 16. For the convenience of explanation, the contents overlapping with the embodiments having been described with reference to FIGS. 1 to 15 will be briefly described or will be omitted.

Figure 16:
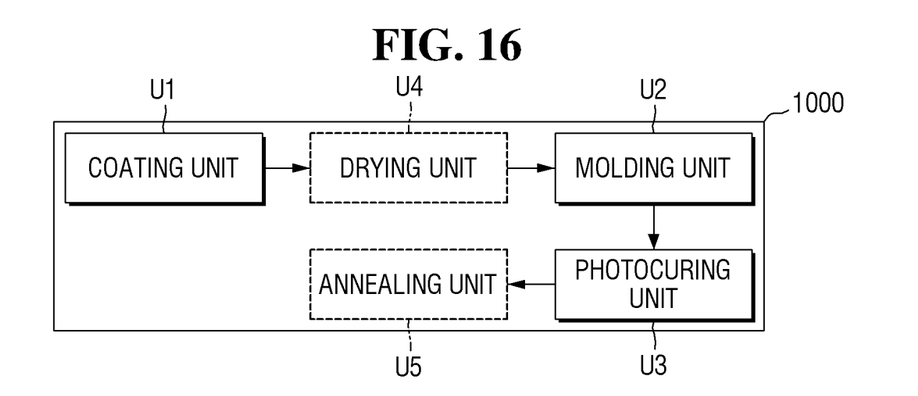
FIG. 16 is a block diagram illustrating an apparatus for forming a coating layer according to some example embodiments.

FIG. 16 is a block diagram illustrating an apparatus for forming a coating layer according to some example embodiments.

Referring to FIG. 16, the apparatus 1000 for forming a coating layer includes a coating unit U1, a molding unit U2, and a photocuring unit U3.

Referring to FIGS. 2A and 2B, the coating unit U1 may form a coating layer 300 on a target object 200.

Referring to FIGS. 3 and 4, the molding unit U2 compresses the coating layer 300 to form a compressed coating layer 300.

Referring to FIGS. 5 and 6, the photocuring unit U3 irradiates the compressed coating layer 300 with ultraviolet (UV) rays to form a cured coating layer 300.

Therefore, the apparatus for forming a coating layer according to some example embodiments can provide the cured coating layer 320 having improved functions.

Referring to FIG. 8, in some example embodiments, the apparatus 1000 for forming a coating layer may use a capacitive touch panel as the target object 200. Therefore, the apparatus for forming a coating layer according to some example embodiments can provide the cured coating layer 320a having an improved function for the capacitive touch panel.

In some example embodiments, the apparatus 1000 for forming a coating layer may further include a drying unit U4. Referring to FIGS. 9 and 10, the drying unit U4 dries the coating layer 300 to remove all or a part of the solvent S. Therefore, the apparatus for forming a coating layer according to some example embodiments, can provide the cured coating layer 320 having improved functions, and can adjust the physical properties of the cured coating layer 320 by adjusting the degree of drying the coating layer 300a.

In some example embodiments, the apparatus 1000 for forming a coating layer may further include an annealing unit U5. Referring to FIG. 11, the annealing unit U5 may anneal the cured coating layer 300 after forming the cured coating layer 300. Therefore, the apparatus for forming a coating layer according to some example embodiments can provide the cured coating layer 320 having further improved functions.

While the inventive concepts are particularly shown and described with reference to example embodiments thereof, it will be understood by those of ordinary skill in the art that various changes in form and details may be made therein without departing from the spirit and scope of the example embodiments as defined by the following claims. It is therefore desired that the example embodiments be considered in all respects as illustrative and not restrictive, reference being made to the appended claims rather than the foregoing description to indicate the scope of the embodiments.

What is claimed is:

1. A photocurable coating composition, comprising:
   about 50 to about 150 parts by weight of a urethane acrylate oligomer having a number average molecular weight of about 1300 to about 1700 g/mol and about 9 functional groups;
   about 50 to about 150 parts by weight of an acrylate monomer;
   about 10 to about 15 parts by weight of a photoinitiator; and
   about 1 to about 3 parts by weight of a surfactant,
   the parts by weight of the urethane acrylate oligomer and the acrylate monomer sum to 200,
   wherein parts by weight is a content of substances to a reference substance by a weight ratio, the reference substance is the urethane acrylate oligomer.

2. The photocurable coating composition of claim 1, wherein the urethane acrylate oligomer is included in an amount of about 90 to about 110 parts by weight, and the acrylate monomer is included in an amount of about 90 to about 110 parts by weight.

3. The photocurable coating composition of claim 1, wherein the surfactant includes a modified silicon polymer.

4. The photocurable coating composition of claim 1, further comprising:
   at least one of $TiO_2$, $ZrO_2$, and $SiO_2$.

5. The photocurable coating composition of claim 1, further comprising:
   at least one of diamond and alumina.

6. A method of forming a coating layer, comprising:
   forming a coating layer on a target object;
   compressing the coating layer to form a compressed coating layer; and
   irradiating the compressed coating layer with ultraviolet rays to form a cured coating layer,
   wherein the coating layer includes about 50 to about 150 parts by weight of a urethane acrylate oligomer having a number average molecular weight of about 1300 g/mol to about 1700 g/mol and about 9 functional groups, about 50 to about 150 parts by weight of an acrylate monomer, about 10 to about 15 parts by weight of a photoinitiator, about 1 to about 3 parts by weight of a surfactant, and the parts by weight of the urethane acrylate oligomer and the acrylate monomer sum to 200,
   wherein parts by weight is a content of substances to a reference substance by a weight ratio, the reference substance is the urethane acrylate oligomer.

7. The method of claim 6, wherein
   the forming the compressed coating layer includes compressing the coating layer with a mold, and
   the forming the cured coating layer includes irradiating the compressed coating layer with ultraviolet rays while the compressed coating layer is formed.

8. The method of claim 7,
   wherein the mold includes ITO.

9. The method of claim 7, wherein
   the mold includes a pattern, and
   the cured coating layer includes a corresponding pattern corresponding to the pattern.

10. The method of claim 6, wherein
    the coating layer further includes a solvent, and
    the method further includes drying the coating layer to remove at least a part of the solvent after forming the coating layer.

11. The method of claim 6, further comprising:
    annealing the cured coating layer after forming the cured coating layer.

12. The method of claim 6, further comprising:
    forming a spacer defining a coating region on the target object before forming the coating layer,
    wherein the coating layer is formed in the coating region.

13. The method of claim 12, wherein the forming the compressed coating layer comprises:
    compressing the coating layer with a mold; and
    stopping the compressing the coating layer with the mold when the mold comes into contact with the spacer.

14. The method of claim 6, wherein the forming the coating layer on the target object comprises forming the coating layer on a capacitive touch panel.

15. The method of claim 6, wherein the urethane acrylate oligomer is included in an amount of about 90 to about 110 parts by weight, and the acrylate monomer is included in an amount of about 90 to about 110 parts by weight.

16. A coated capacitive touch panel, comprising:
    a capacitive touch panel; and
    a coating layer on the capacitive touch panel, the coating layer having a substantially uniform shape and including a photocurable coating composition that includes:
        about 50 to about 150 parts by weight of a urethane acrylate oligomer having a number average molecular weight of about 1300 to about 1700 g/mol and about 9 functional groups;
        about 50 to about 150 parts by weight of an acrylate monomer;
        about 10 to about 15 parts by weight of a photoinitiator; and
        about 1 to about 3 parts by weight of a surfactant,
        the parts by weight of the urethane acrylate oligomer and the acrylate monomer sum to 200,
    wherein parts by weight is a content of substances to a reference substance by a weight ratio, the reference substance is the urethane acrylate oligomer.

17. The coated capacitive touch panel of claim 16, wherein the surfactant is included in an amount of about 1 part to about 3 parts by weight and includes a modified silicon polymer.

* * * * *